J. C. Johnson.
TRANSMISSION MECHANISM.
APPLICATION FILED MAR. 12, 1915.

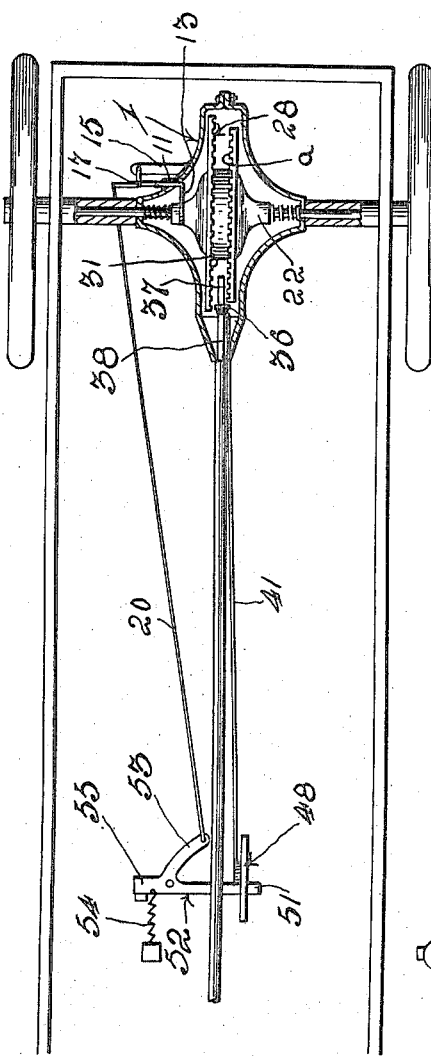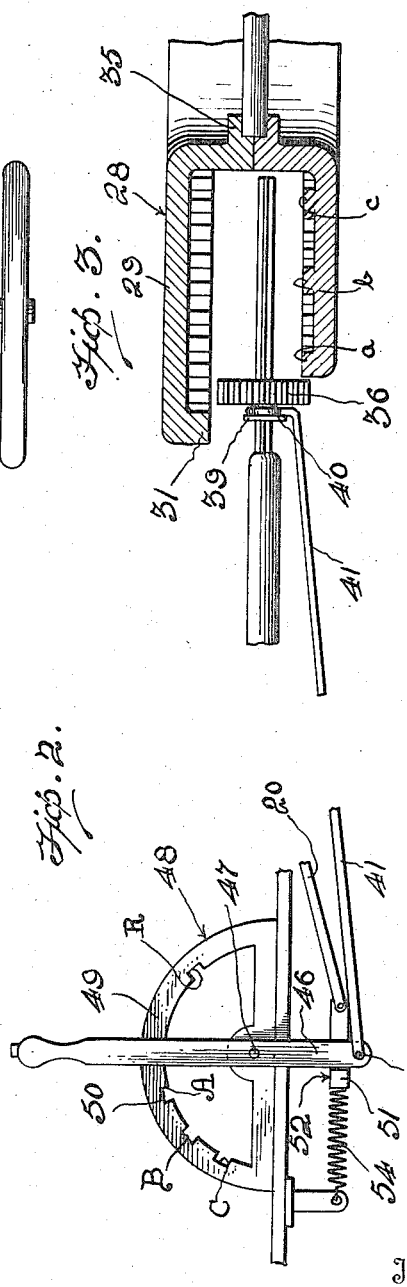

1,229,088.

Patented June 5, 1917.
2 SHEETS—SHEET 2.

Inventor
J. C. Johnson.

UNITED STATES PATENT OFFICE.

JOHN C. JOHNSON, OF CROMWELL, IOWA.

TRANSMISSION MECHANISM.

1,229,088.  Specification of Letters Patent.  Patented June 5, 1917.

Application filed March 12, 1915. Serial No. 13,945.

*To all whom it may concern:*

Be it known that I, JOHN C. JOHNSON, a citizen of the United States, residing at Cromwell, in the county of Union and State of Iowa, have invented certain new and useful Improvements in Transmission Mechanism; and I do hereby declare the following to be a full, clear, and exact description of the invention, such as will enable others skilled in the art to which it appertains to make and use the same.

This invention relates to new and useful improvements in transmissions and has for its principal object to provide a device in which it is possible to combine transmission gearing and the differential gears in the same casing, thereby avoiding the necessity of providing two separate housings therefor.

Another object of the invention is to provide a transmission gearing which is carried on the differential and by which the shifting of the gears may be easily effected.

Another object of the invention is to provide a novel means for shifting the reverse gear which is controlled from the same lever as the one controlling the shifting of the remaining gears.

With these and other objects in view, the invention consists in the novel combination and arrangement of parts which will be fully set forth in the following specification and accompanying drawings, in which:

Figure 1 is a plan view of the rear portion of a chassis showing the improved combination differential and transmission gears partly in section to clearly illustrate the details of construction.

Fig. 2 is a plan view of the controlling lever.

Fig. 3 is a sectional view of a fragment of the differential and transmission.

Figure 4:
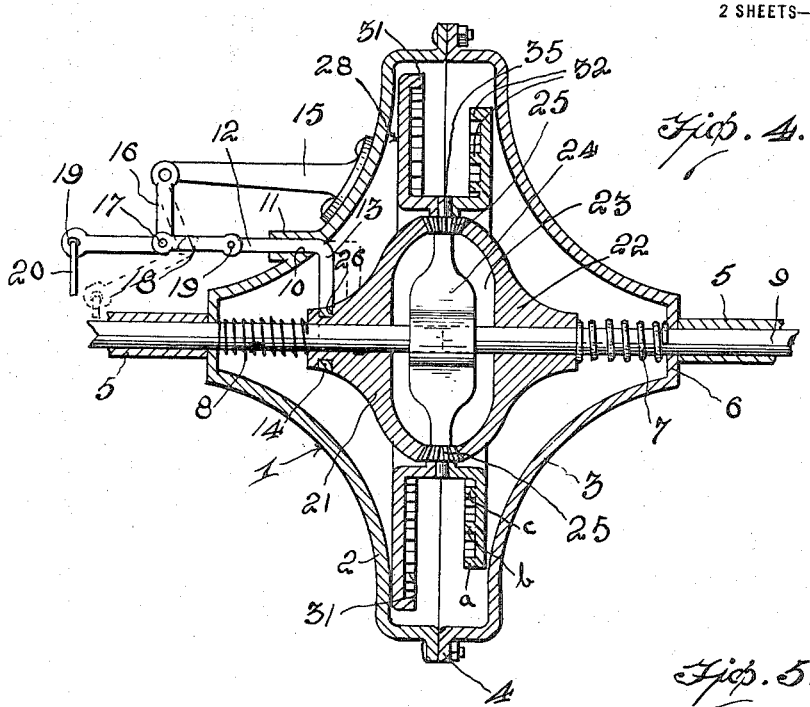
Fig. 4 is a view on an enlarged scale showing the combined differential and transmission in section.
Figure 5:
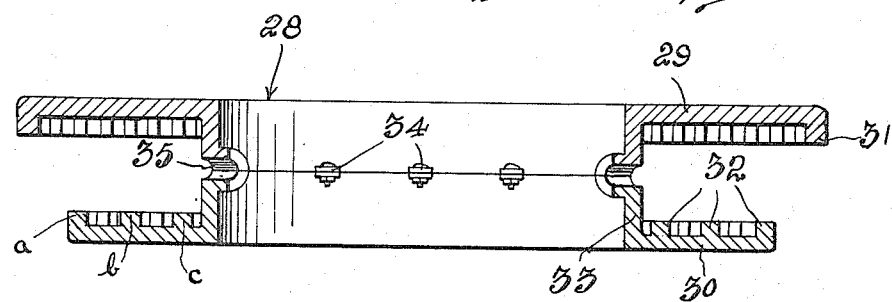
Fig. 5 is a view of the differential casing showing the same in section to more clearly illustrate the details of construction.
Figure 6:
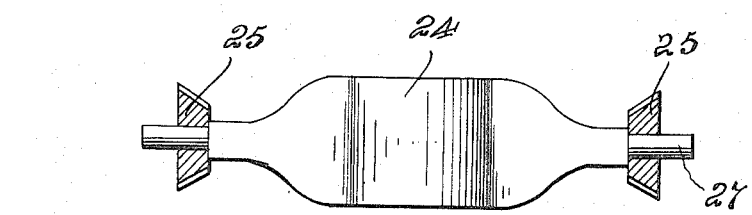
Fig. 6 is a detail view of the shaft carrying the driving pinion.

Referring now to the drawings, the numeral 1 designates as an entirety the combined transmission and differential casing which is formed of two separate sections 2 and 3. These sections are provided with suitable connecting flanges 4 through which bolts or other fastening means extend. The axle casings 5 extend from each side of the section and are connected to the walls 6 against which the coil springs 7 and 8 bear. The driving axle 9 is formed of two separate sections which abut at a point centrally of the casing as clearly shown in Fig. 4. One of the sections of the casing is formed with an opening 10 and carries the sleeve 11, which is provided with a bore which alines with the opening 10 and forms a guide for the controlling arm 12, one end of which is bent angularly as at 13 and provided with the fork 14, the use of which will appear as the description proceeds. A suitable supporting bracket 15 is bolted or otherwise secured to the section which is provided with the opening 10 and this bracket is arranged to support the bell crank lever 16 which has pivoted intermediate its ends as at 17 thereto the link 18 the opposite end of which is pivoted as at 19 to the controlling arm 12 heretofore referred to. The opposite end of the bell crank 16 is apertured as at 19 and the flexible member 20 is connected thereto as clearly shown in Fig. 4. It will thus be seen that when the flexible member is pulled the arm 16 will swing on the pivot at the end of the bracket 15 and thereby move the controlling arm 12 into the dotted line position shown in Fig. 3.

Splined or otherwise secured against radial movement on the axle 9 are the gears 21 and 22 which are dished to form a chamber 23 for the reception of the shaft 24 having rotatably mounted at its end the gears 25. These gears 25 mesh with the gear teeth on the gears 22 and it will thus be seen that a differential gear which will drive the shaft or axle 9 is provided. A suitable annular groove 26 is formed in one of the gears 21 and is arranged to receive the fork 14 of the arm 13 of the controlling arm 12. The cylindrical ends 27 of the shaft 24 which project beyond the gears 25 are journaled in suitable bearings in the flanges of the transmission ring gears which constitute reverse and changeable speed gears and are designated generally by the numeral 28. These gears comprise two separate ring sections 29 and 30 which respectively carry the reverse gear teeth 31 and the gear teeth 32 which drive the vehicle in a forward direction. Suitable inturn flanges 33 are formed at the inner edges of the rings 29 and 30 and these flanges are provided with suitable ears 34 through which suitable bolts extend by which they are held in operative position. Formed at diametrically opposite points in each of the flanges 33 are the openings 35 which are arranged to receive the ends 27 of the shaft 24 hereinbefore described. The gear teeth 32 are arranged in three different series $a$, $b$ and $c$ which are respectively low, intermediate and high speed gears. These gear teeth are arranged to mesh with the spur gears 36 carried on the squared end 37 of the propeller shaft 38 of the vehicle and it will be apparent that when the gear 36 is shifted into the position shown in Fig. 1, it will be neutral and when it engages with the series $a$ of the gear teeth 32, the car will be driven at low speed. Upon shifting the gear into mesh with the teeth $c$ it will be evident that the speed will be increased and likewise upon shifting the gear 33 into mesh with the series of teeth $c$. In this way it will be evident that a number of varying speeds may be transmitted to the axles 9 on which the drive wheels are mounted.

In order to control the shifting of the gear 36, the same is provided with a grooved hub 39 around which the forked end 40 of the rod 41 extends. This rod is pivoted at its forward end as at 42 to the lower end of the lever 43. This lever 46 is pivoted as at 47 to a suitable frame 48 carrying the quadrant 49, which is provided with a plurality of notches 50. A suitable dog (not shown) is arranged to engage in the notches 50 to hold the lever in its various positions and it will be apparent that when the lever is in the first notch designated by the character A, the gear 36 will be in mesh with the series of teeth $a$. Upon moving the lever farther forward so that the latch engages in the notch D it will be apparent that the gear 36 will mesh with the series of teeth $b$ and likewise upon moving the lever so that the latch engages in the notch C, the gear 36 will mesh with the series of teeth $b$. When it is desired to reverse the lever is thrown so as to engage in the notch R and it will be apparent that the lower end thereof will engage the arm 51 of the bell crank designated generally by the numeral 52 and will thus cause the opposite arm of the bell crank 53 to move forwardly and exert pull on the flexible member 20 which will in turn operate the bell crank 16 and thereby slide the arm 12 so as to cause the fork 14 to push the differential and transmission gears into the dotted line position shown in Fig. 4 and simultaneously with this movement the lever 46 will exert pull on the rod 41 and thereby shift the gear 36 into mesh with the gear teeth 31 thereby effecting a reversal of the rotation of the drive axle 9. In order to hold the bell crank 52 against the lever 46 the coil spring 54 is provided and connected to the extension 55 on the bell crank and it will thus be apparent that the same will be held normally in the position shown in Fig. 1. In order that the series of teeth $a$, $b$ and $c$ will be held normally in position to be engaged by the gear 36, the spring 7 is stronger than the spring 8 and thus holds the device in a position shown in Figs. 1 and 4.

From the foregoing it will be apparent that there has been provided a particularly simple and efficient means for controlling the speeds of motor vehicles and the like which may be controlled from a single lever and which will effectively shift the gears into the various speeds with a minimum exertion on the part of the user. It is also apparent that the device may be combined in a single casing at the rear of the vehicle thereby avoiding the necessity of providing a separate transmission and differential casing.

While in the foregoing there has been shown and described the preferred embodiment of this invention, it is to be understood that such changes may be made in the combination and arrangement of parts as will fall within the spirit and scope of the appended claim.

What is claimed is:—

In a power transmission mechanism, a casing having a slot therein, a change speed gear and reverse gear slidably mounted within the casing, a bracket carried by the casing, a bell crank lever pivoted to the bracket and having one arm extending through the slot in the casing and operatively connected to the gearing, a propeller shaft having one end extending into the casing and located between the change speed gear and the reverse gear, a spur gear mounted on the mentioned end of the shaft, springs interposed between the casing and the change speed gear and reverse gear, the spring interposed between the change speed gear and the casing being of greater strength than the other spring so as to normally effect engagement between the change speed gear and the spur gear, and means operatively connected to the other arm of the bell crank lever and adapted when operated to rock the bell crank lever so as to cause disengagement of the change speed gear from the spur gear and to move the reverse gear into engagement with the spur gear.

In testimony whereof I affix my signature in presence of two witnesses.

JOHN C. JOHNSON.

Witnesses:
   PETER O. JOHNSON,
   JAMES KOSAR.